Aug. 17, 1926.

J. B. CLAY 1,596,077

FEED TROUGH

Filed June 11, 1921    2 Sheets-Sheet 1

Witnesses.
W. P. Kilroy
Harry A. White

Inventor.
Joseph B. Clay
By  Attys

Aug. 17, 1926.   1,596,077
J. B. CLAY
FEED TROUGH
Filed June 11, 1921   2 Sheets-Sheet 2
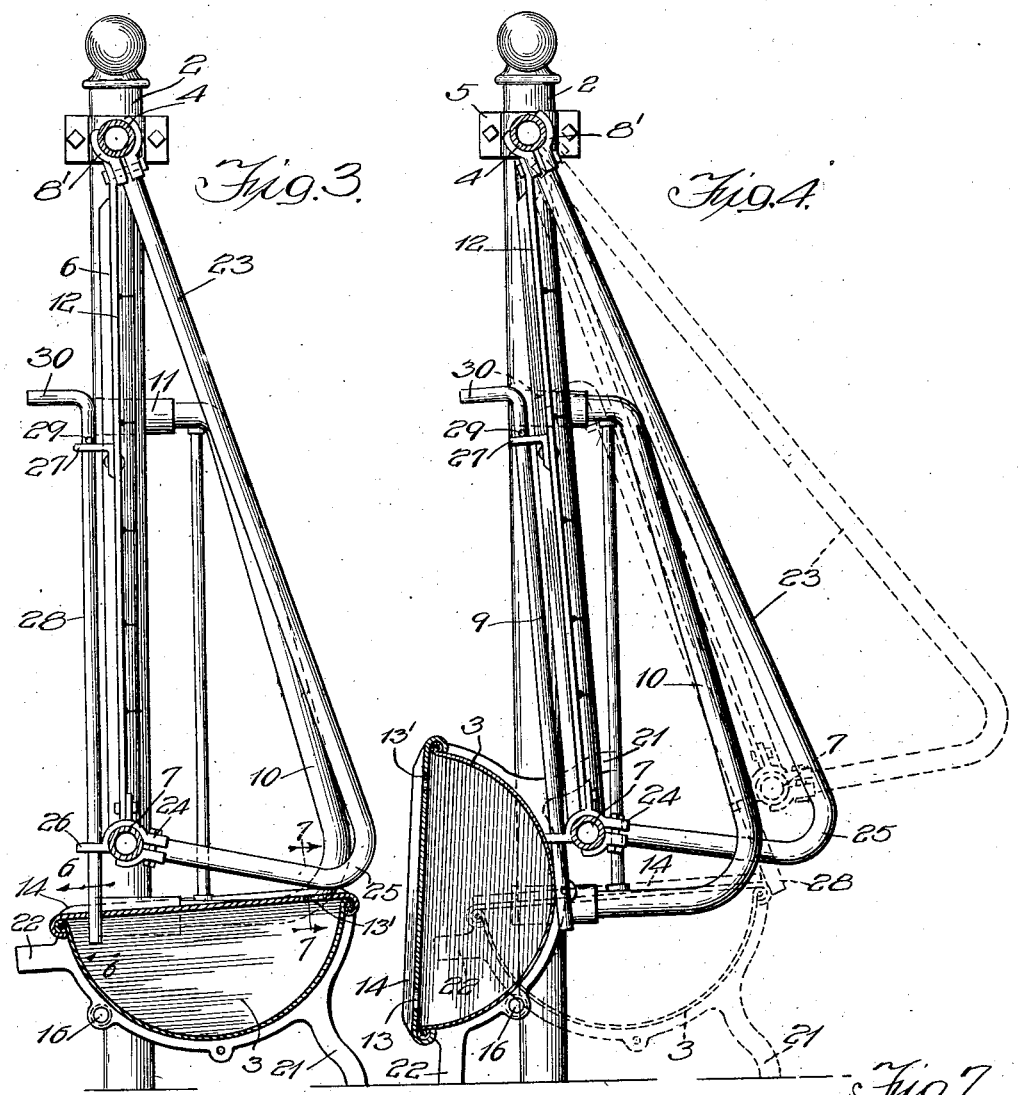
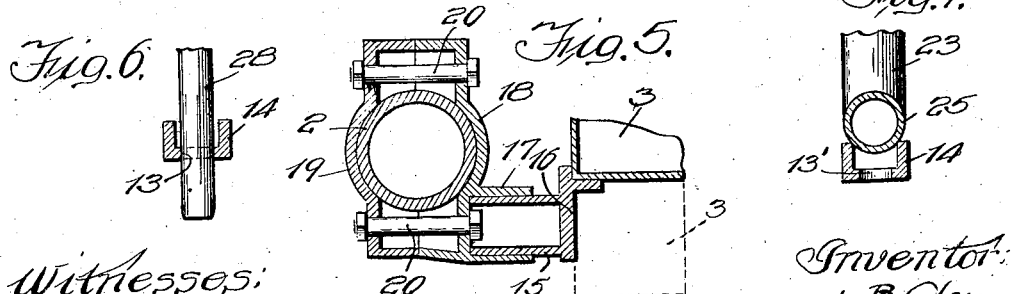
Witnesses:
W. P. Kilroy
Harry R. White
Inventor:
Joseph B. Clay
By [signature], Attys.

Patented Aug. 17, 1926.

1,596,077

UNITED STATES PATENT OFFICE.

JOSEPH B. CLAY, OF CEDAR FALLS, IOWA.

FEED TROUGH.

Application filed June 11, 1921. Serial No. 476,872.

My invention belongs to that general class of devices known as feed troughs and relates particularly to feed troughs designed for hog pens and the like. The invention has among its objects the production of a device of the kind described that is simple, convenient, durable, reliable, attractive, sanitary, efficient, and satisfactory for use wherever found applicable. It has particularly as an object the production of a trough of the kind described which may be conveniently, efficiently, and satisfactorily cleaned from the exterior of the pen. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts;

Figure 3 is a sectional view taken substantially on line 3—3 of Figure 1;

Figure 4 is a similar view showing the trough adjusted for cleaning;

Figure 5 is a sectional view taken substantially on line 5—5 of Figure 1;

Figure 6 is a sectional view taken substantially on the line 6—6 of Figure 2; and Figure 7 is a sectional view taken substantially on the line 7—7 of Figure 3.

Figure 1:
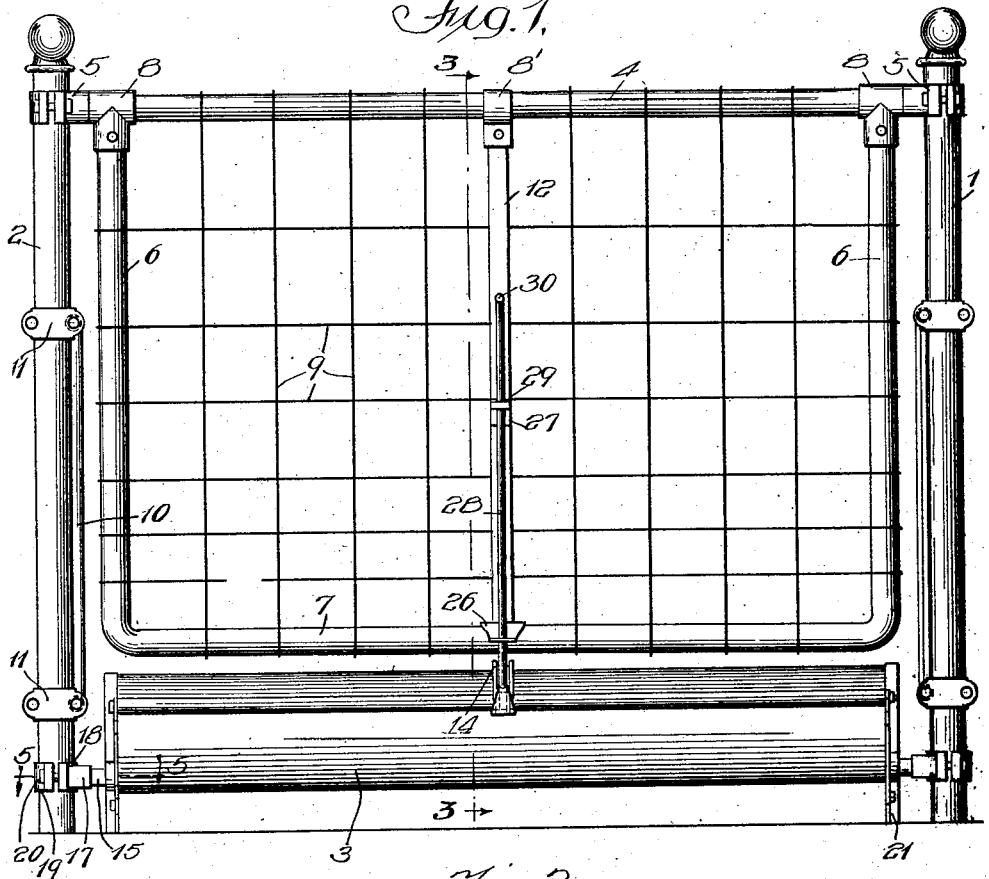
Figure 1 is a view in elevation of my improved trough as applied to a hog pen.
Figure 2:
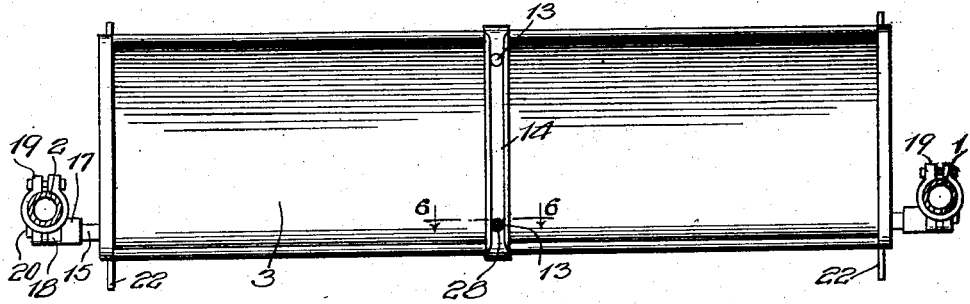
Figure 2 is a plan view of the trough.

Referring to the drawings, I have shown a portion of the pen, 1 and 2 being posts forming a part of the enclosure between which my improved trough 3 is preferably arranged. It may be mentioned that the space above the trough between the posts 1 and 2 is enclosed by a tilting or adjustable panel, as shown, consisting of a bar 4 carried by brackets 5—5 from the posts 1 and 2, and frame bars 6—6 and 7, which are connected together by suitable fittings 8 and a wire fabric 9.

The trough 3 is of a suitable size, shape and material, the same being reenforced in any desired manner and provided with the cross bar 14, said cross bar being in the form of a channel and having openings 13 and 13' therethrough adjacent the outer and inner ends thereof. The cross bar 14 not only reenforces the trough but also co-operates with the panel and locking mechanism, as hereinafter described, so as to maintain the panel in the desired position and to prevent the trough from being accidentally overturned. The trough is pivotally supported at each end, the same in the construction shown being pivotally connected with and supported by the posts 1 and 2. As shown, I provide lugs or pivot members 15 which may be provided with bases 16, said pivot members being attached to the trough at each end thereof, preferably at the front edge or adjacent thereto. The members 15 are pivotally supported in sockets 17 arranged one at each side or end of the trough. The socket members, are shown formed with clamp parts 18 and clamped in place on the posts by means of parts 19 and bolts 20, or equivalent means for the purpose.

I also preferably provide one or more legs 21 at the opposite or inner side of the trough which will serve to support the same when in operative feeding position, as shown in Figures 1 and 3. For convenience in tilting the trough, I provide one or more tilting or extension members 22, which may be manipulated by the foot of the caretaker so that the depressing of member 22 will tilt the trough, substantially as shown in Figure 4. Suitable mechanism may be provided in order to prevent the stock from lifting or tilting the trough and discharging the contents thereof into the runway, said mechanism being more fully hereinafter described. Guards 10 are provided at each end of the panel to prevent the animal from passing around the ends of the panel, said guards being secured to the posts 1 and 2 by a suitable clamping means 11. A guard bar 23 is secured to the bar 4 by a clamp or fitting 8', or the equivalent, the bar standing at an angle to the enclosure with the lower end 25 extended, and connected to the bar 7 by a clamp 24 or equivalent means for the purpose. Positioned centrally of the panel and extending from top to bottom thereof, is a reenforcing member or brace rod 12, said brace rod being secured to the guard bar at its upper end as shown. An extension 26 is formed on one of the clamping parts 24 and a co-operating extension member 27 is secured to the brace rod 12, both parts 26 and 27 having aligned apertures therethrough to slidably receive a locking bar 28, said locking bar having a cross pin 29 therethrough, and adapted to limit the downward movement of the locking bar through said apertures. The upper end 30 of said locking bar is laterally offset to provide a gripping portion or handle whereby the bar may be manipulated. The lower end of the locking bar 28 is adapted to enter the opening 13 formed in the channelled bar 14 of the trough, as shown, in order to prevent tilting movement of the trough or the panel. The locking bar 28 may be inserted through the opening 13′ to hold the panel in its tilted position if desired, or if it is desired to completely tilt the trough for cleaning, the locking bar is arranged as shown in Figure 4. The lower end 25 of the guard part 23 is adapted to engage the channel bar 14 at its inner end to further prevent the accidental tilting of the trough when the trough is in its normal position, as shown.

In order to tilt the trough from it normal position, the locking bar is first released from the opening 13 and the panel tilted inwardly out of the path of the trough, then depressing the member 22 will move the trough or tilt it about its pivots 15. It will be noted that when the trough is tilted, owing to the arrangement of its pivotal axis being off-center, or adjacent the outer side or edge of the trough, the trough will remain in its tilted position owing to gravity, its tilting, however, being limited by the engagement of the member 22 with the floor so that the same will not be accidentally thrown entirely over, nor when locked or when tilted, can it be pushed over by the stock from the inside. It will be noted that when the trough is tipped or tilted, as shown in Figure 4, the same may be entirely cleaned out and flushed with water, or scrubbed with a broom or brush, every particle of sediment, water or the like being removed. This is of great importance as the trough may be always kept in a sanitary condition. While I have particularly mentioned the same being applicable for hogs, obviously the same may be employed wherever desired, regardless of the stock to be fed.

Having thus described my invention it is obvious that various immaterial modifications may be made in the same without departing from the spirit of my invention; hence I do not wish to be understood as limiting myself to the exact form, arrangement, construction and combination of parts herein shown and described, or uses mentioned.

What I claim as new and desire to secure by Letters Patent is:—

1. In a device of the kind described and in combination, a pen structure comprising a panel and a feed trough therebelow, said feed trough being pivotally mounted at its ends so as to be tiltable on its pivotal axis, and means carried by said parts and interengageable with one another to normally prevent the tilting of the trough, said means comprising a rod carried by said panel and a strap across said trough having an opening therein, said rod being detachably engageable in said opening.

2. In a device of the kind described and in combination, a pen structure comprising a panel and a feed trough therebelow, said feed trough being pivotally mounted at its ends so as to be tiltable on its pivotal axis, said trough having a strap thereacross with an opening therethrough adjacent the outer end of said strap, a rod carried by said panel and detachably engageable in said opening, the inner side of said trough being engageable by said panel in its normal position, whereby the trough is held against tilting at both its inner and outer sides.

3. In a device of the kind described and in combination, a pen structure comprising a panel and a pan shaped feed trough therebelow, said feed trough being pivotally mounted at its ends so as to be tiltable on its pivotal axis, a channel shaped bar across said trough having an opening therein adjacent its outer side, a locking rod carried by said panel and detachably engageable in said opening, the lower end of said panel being also engageable with said channel bar at its opposite side, whereby accidental tilting of said trough is prevented.

4. In a device of the kind described, and in combination, a pen structure, comprising a panel pivotally carried between two posts, and a feed trough also pivotally carried between said posts, said panel provided intermediate its ends with a guard extending to one side thereof, said trough provided intermediate its ends with a transverse bar, said guard and said transverse bar adapted to contact at one side of said trough when the trough and panel are in operative position to prevent displacement of the trough, and means carried by said panel for releasably engaging the trough when said trough is in such operative position.

In testimony whereof, I have hereunto signed my name.

JOSEPH B. CLAY.